RECEIVER FOR RECEIVING NONORTHOGONAL MULTIPLEXED SIGNALS

Filed May 31, 1966 2 Sheets-Sheet 1

INVENTOR.
FORREST F. FULTON, JR.
BY
George C. Sullivan
Agent

INVENTOR.
FORREST F. FULTON, JR.
BY George C. Sullivan
Agent 3,456,195
Patented July 15, 1969

3,456,195

RECEIVER FOR RECEIVING NONORTHOGONAL MULTIPLEXED SIGNALS

Forrest F. Fulton, Jr., Los Altos, Calif., assignor to Lockheed Aircraft Corporation, Burbank, Calif.

Filed May 31, 1966, Ser. No. 554,147
Int. Cl. H04b *1/10*
U.S. Cl. 325—323 5 Claims

ABSTRACT OF THE DISCLOSURE

A communications receiver capable of receiving and recovering nonorthogonal signals being transmitted on the same channel by two transmitters is disclosed. This recovery of nonorthogonal random carrier phase signals produces an improvement in the utilization of channel bandwidth.

The present invention relates to a communications receiver capable of producing an improvement in the utilization of channel bandwidth by obtaining an accurate recovery of nonorthogonal, random carrier phase signals that have been multiplexed into the channel.

Increasing demands for space in the frequency spectrum will eventually force the simultaneous use of an assignment of frequency or channel by more than one link. A problem of receiving nonorthogonal signals arises when the signals simultaneously occupy the same frequency and phase coordinates. This occurs, by design, in a system providing efficient random access multiplexing, because the signals must necessarily be nonorthogonal in such systems. Of particular interest is the case where no RF phase coherence can be obtained between the signals, for example, when a satellite communications repeater is relaying signals originating at different points on the earth. A paper describing a communication system for receiving nonorthogonal signals and including a theoretical and mathematical discussion appeared in the "Conference Record" of the First I.E.E.E. Annual Communications Convention, June 7, 1965.

Figure 1:
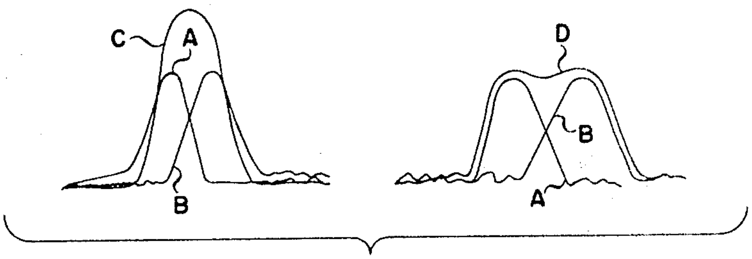

Consider a two-transmitter communications system with binary on-off moduations. The system transmits simultaneous 10 microsecond pulses at carrier frequencies of 5 megacycles and 5—$\alpha$ megacycles where $\alpha$=the separation frequency, with independent on-off modulations of the two transmitters. FIGURE 1 shows the spectra of the signals for two conditions of frequency separation. Waveform A and waveform B show the spectra of the individual transmitters, and waveform C the combined spectrum, when separation is approximately 50 kc. Waveform D shows the combined spectrum when separation of waveforms A and B is 100 kc. It is apparent from the overlapping of the individual spectra that conventional receiving techniques are unable to separate the signals.

Figure 2:
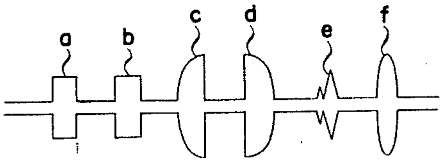

Another example of the problem of receiving this type of signals is illustrated in FIGURE 2 which shows a sequence of six RF pulse waveforms. The first pulse waveform *a* is from the 5 megacycle transmitter alone. The second waveform *b* is from the 5—$\alpha$ transmitter, and the other four waveforms, *c, d, e,* and *f,* are combined pulses from both transmitters, with various initial phase conditions. This shows that a receiver must also be able to recognize a variety of waveforms in order to demodulate the signals accurately.

It is the object of the present invention to provide a communications receiver capable of receiving and recovering nonorthogonal signals being transmitted on the same channel by two transmitters.

Figure 4:
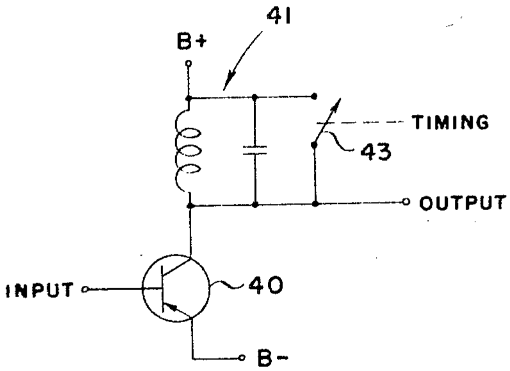
Figure 3:
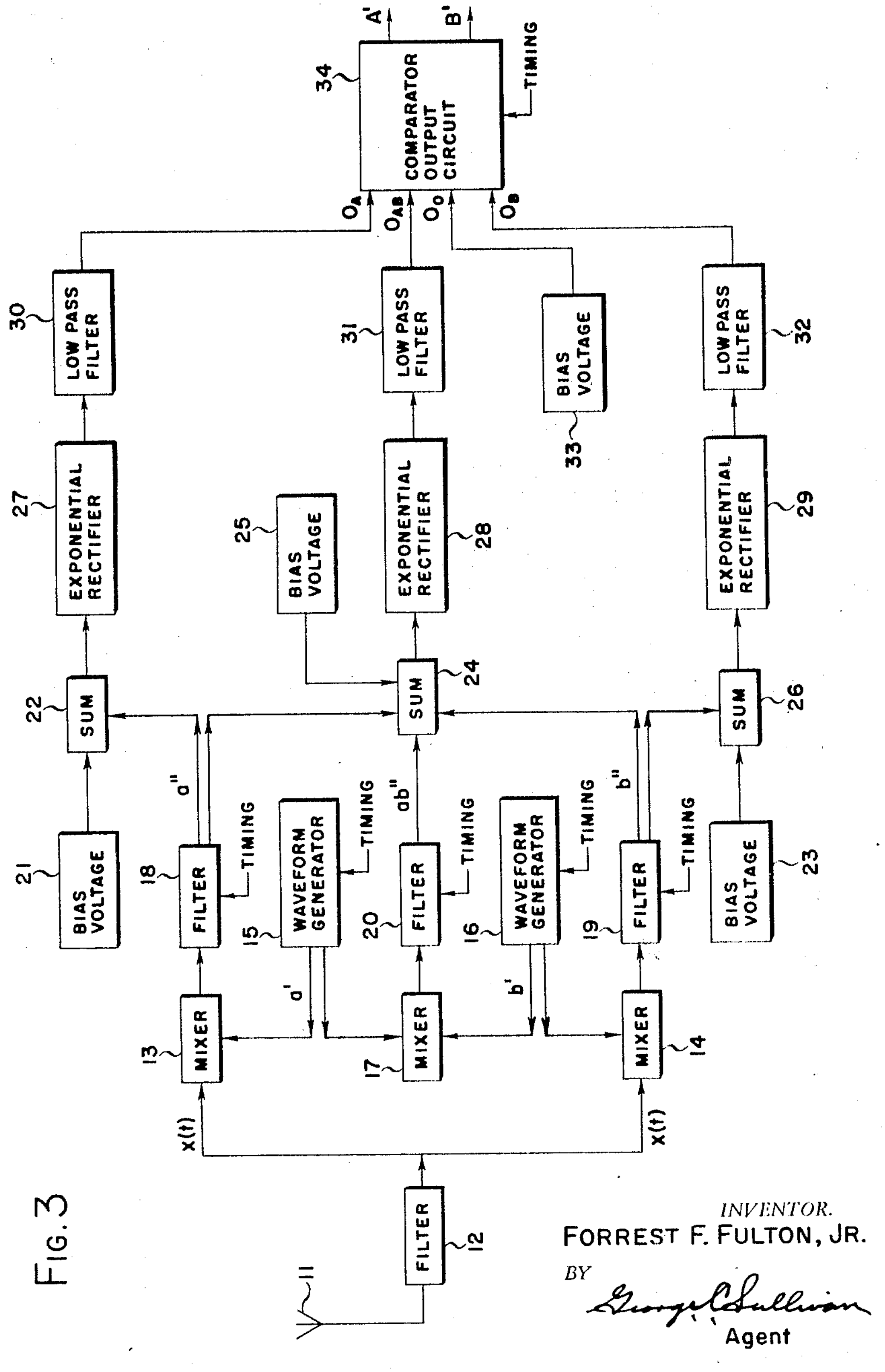

This object and other objects and features of the present invention will become apparent to those skilled in the art of communications after a careful perusal of the following specification and drawings of which:

FIGURE 1 and FIGURE 2 are waveforms of received signals that have been transmitted in the same frequency channel, FIGURE 3 is a block diagram of the present system, and FIGURE 4 is a schematic drawing of the keyed bandpass integrator filters shown in the block diagram of FIGURE 3.

Referring now to the block diagram shown in FIGURE 3, an input antenna 11 is shown connected to an image reject filter 12. Image reject filter 12 passes only the transmitted signal $X_t$ which contains at various times transmitted signal frequencies $A_t$ and $B_t$, $A_t$ alone, or $B_t$ alone and rejects all of the image frequencies therefrom. This type of image reject filter is well known in the superheterodyne receiver art. The output from the image reject filter 12 is connected to mixers 13 and 14. Mixer 13 is also connected to receive the output $a'$ from a waveform generator 15 which produces a replica of transmitted waveform $A_t$ except at a carrier frequency different by an amount $\Delta\omega_a$. Similarly, mixer 14 is connected to receive the output $b'$ from a waveform generator 16 which produces a replica of the transmitted waveform $B_t$ except at a carrier frequency different by an amount $\Delta\omega_b$. The output signals from waveform generator 15 and waveform generator 16 are also connected to a mixer 17. The output from mixer 13 is connected to a keyed bandpass integrator filter 18. The output from mixer 14 is likewise connected to a keyed bandpass integrator filter 19. Both filters 13 and 14 are matched to the waveform resulting from mixing $A_t$ and $a'$, and $B_t$ and $b'$, respectively. The output from keyed bandpass integrator filter 18, tuned to $\Delta\omega_a$, is a waveform defined as waveform $a''$ and similarly, filter 19 is tuned to frequency $\Delta\omega_b$ and passes only an output waveform defined as $b''$. The output from mixer 17 is connected to keyed bandpass integrator filter 20 which is tuned to $\Delta\omega_a$–$\Delta\omega_b$, and produces a waveform defined as $ab''$. The keyed bandpass integrator circuits, the waveform generators, and the comparator-output circuits discussed later, are all synchronized by a timing signal that is synchronized to the incoming signals by standard techniques.

Keyed bandpass integrator filters 18, 19, 20 are shown in FIGURE 4 and comprise a transistor 40 having a tuned circuit 41 connected to its collector. Tuned circuit 41 is shunted into or out of the circuit by switch 43. Switch 43 is controlled by the timing signal and is open during the time interval when incoming signals $A_t$ or $B_t$ may be present. Filter 18 has its circuit 41 tuned to a narrow band, the frequency of signal $a''$. Filter 19 is tuned to the frequency of signal $b''$ and similarly, filter 20 has its tuned circuit tuned to the frequency of signal $ab''$.

The output signal $a''$ from filter 18 is connected to a summing circuit 22 which is also provided with a biased voltage from bias voltage source 21; the summing circuit 23 may be an ordinary resistor network. The output from filter 19, $b''$, is connected to summing circuit 26 which is biased by a biasing voltage from bias voltage source 23. The output from filter 20, $ab''$, is connected to summing circuit 24 which is biased by biasing voltage source 25. Summing circuit 24 is also connected to receive the output signals $a''$ and $b''$ from filters 18 and 19, respectively.

The output from summing circuits 22 is connected to an exponential rectifier 27 which is then connected to a low pass filter 30; the exponential rectifier circuit may be obtained, as is well known, by using the natural characteristics of semiconductor diodes. The output waveform from summing circuit 26 is connected to exponential rectifier 29 and from there to a low pass filter 32 and the output from summing circuit 24 is likewise connected to an exponential rectifier 28 and then to a low pass filter 31. The outputs from the low pass filters 30, 31 and 32 are all connected to comparator-output circuit 34. The comparator-output circuit 34 also receives a biasing voltage from a biasing voltage source 33.

Operation of the receiver described above is as follows. Assume an input signal $X_t$ is received by antenna 11. Input signal $X_t$ may, for example, contain signals $A_t$ and $B_t$, $A_t$ alone or $B_t$ alone or just noise. Let us also assume that transmitter waveforms $A_t$ and $B_t$ are simultaneously 10 microsecond pulses of sinusoidal carriers at 5 megacycles and 5—$\alpha$ megacycles respectively. A difference frequency $\alpha$ is adjustable over a discrete set of values to permit varying the envelope correlation between the two waveforms.

If we first assume that input signal $X_t$ contains both transmitted signals $A_t$ and $B_t$, then these signals are mixed in mixers 13 and 14, respectively, with the outputs $a'$ and $b'$ from waveform generators 15 and 16, respectively. Waveform generator 15 produces a replica of the $A_t$ waveform except that a carrier frequency different by an amount $\Delta\omega_a$ which we can place, for example, at one megacycle, for the 10 microsecond pulses. Waveform generator 16 produces a waveform replica of $B_t$ but with a carrier frequency different from $B_t$ but also different from waveform generator 15. The difference $\Delta\omega_b$ should be substantially larger than $\Delta\omega_a$ so that all combinations of the phase angles of $a''$ and $b''$ will occur. This can be accomplished by having a large ratio of $\Delta\omega_a$ to $\Delta\omega_b$ as well as having $\Delta\omega_b$ much larger than the reciprocal of the 10 msec. pulse. A value of 3.5 megacycles is satisfactory for the present example. Mixer 13 will receive output $a'$ from waveform generator 15 as well as transmitted signal $X_t$ which contains both $A_t$ and $B_t$. Mixer 14 will receive output $b'$ from waveform generator 16 as well as transmitted signal $X_t$. The mixed signals are then connected to filter 18 which is tuned to a $\Delta\omega_a$ or waveform $a''$. Filter 19, on the other hand, is tuned to a narrow band $\Delta\omega_b$ or waveform $b''$. The replica waveforms from generators 15 and 16 are also mixed and filtered by filter 20 which is tuned to $\Delta\omega_a$–$\Delta\omega_b$ called waveform signal $ab''$. The filter outputs from filters 18, 19 and 20 are now at three substantially different frequencies each representing a different RF voltage. The signal $a''$ from filter 18 is added with bias voltage 21 and exponentiated in exponential rectifier 27. The bias voltage level from bias voltage sources 21 and 23 is determined from the expected signals $a''$ and $b''$, respectively, and noise power levels. The output from exponential rectifier 27 is fed to low pass filter which integrates the diode output to produce voltage $O_A$. The output signal $b''$ from filter 19, is similarly summed, exponentiated, and low passed filtered and voltage $O_B$ is produced.

The output from filter 20, waveform $ab''$, is summed with the outputs from filters 18, 19 and a bias voltage source 25.

The filter outputs of voltages at three substantially different frequencies are added along with a DC bias from voltage source 25, a voltage determined from the expected signal and noise power levels. This summation of the output from the three filters and the bias voltage source is exponentiated, low-pass filtered, and passed as a voltage $O_{AB}$. Voltages $O_A$, $O_B$, and $O_{AB}$ are connected to a comparator-output circuit 34; also, a bias voltage source 33, producing a voltage called $O_o$, is connected to the comparator-output circuit 34.

The comparator-output circuit 34 compares the four voltages $O_A$, $O_B$, $O_{AB}$, and $O_o$ to determine which is the largest; this comparator can be implemented, for example, by six two-way comparison circuits. From this determination of the largest, the output circuits included with the comparator indicate whether the signal input to the receiver was A and B, or A alone, or B alone, or just noise, by producing the output indications A′ and B′. If, for example, signal $X_t$ contains only $A_t$ and the output from filter 19 and filter 20 would be reduced and when these signals are exponentiated and lowpass filtered, voltages $O_B$ and $O_{AB}$ would reflect this by producing a very low output voltage and the comparator and output circuits 34 would detect if only $O_A$ was providing an input and so indicate. If, on the other hand, no signal was present, then bias signal 33 would be the largest and circuits 34 would so indicate.

What has been described is a receiver which is able to receive two separate input signals which are being transmitted on nearly the same carrier frequency and to discriminate whether one or the other or both transmitters are transmitting.

Although the invention has been described with respect to a preferred embodiment thereof, it is not to be so limited as changes and modifications may be made therein which are within the full intended scope of the invention, as defined by the appended claims.

What is claimed is:

1. An improved radio communications receiver for receiving and recovering nonorthogonal signals including first and second transmitted waveforms being transmitted on the same channel by first and second transmitters comprising: first and second mixers, means for applying the transmitted signals to said first and second mixers; a first waveform generator connected to said first mixer, said first waveform generator producing a replica of the first transmitted waveform except at a different carrier frequency; a second waveform generator connected to said second mixer, said second waveform generator producing a replica of the second transmitted waveform except at a carrier frequency different from the second transmitted waveform and the waveform produced by said first waveform generator; a third mixer, means for applying the signals from said first and second waveform generators to said third mixer; a first integrator filter connected to an output waveform resulting from mixing the output from said first waveform generator and said first transmitted waveform, means for applying the output from said first mixer to said first integrator filter; a second integrator filter connected to an output resulting from mixing the output from said second waveform generator and second transmitted waveform, means for applying a signal from said second mixer to said second integrator filter; a third integrator filter connected to an output resulting from mixing the output signals from said first and second waveform generator, means for applying the signal from said third mixer to said third integrator filter; summing means connected to the output signals from said first, second, and third integrator filters, means for applying the output signals from said first, second and third integrator filters to said summing means, output comparator circuit means connected to the output signals from said first and second integrator filters and from said summing means, means for applying the output signals from said first and second integrator filters and said summing means to said output comparator circuit means and means whereby said output comparator circuit compares the output from said first and second integrator filters and from said summing means and means whereby said output comparator circuit produces an output signal to indicate whether said first transmitter is transmitting or said second transmitter is transmitting or whether both first and second transmitters are transmitting.

2. In the improved radio communications receiver according to claim 1 whereby the output frequency from said second waveform generator is substantially higher than the output frequency from said first waveform generator and means whereby the output frequency from said second integrator filter is substantially higher than the output from said first integrator filter so that all combinations of the phase angles of the output signals from the first and second integrators filters will occur.

3. The improved radio communications receiver according to claim 2 wherein said summing means includes a first summing circuit, means for applying the output from said first integrator filter to said first summing circuit; a second summing circuit, means for applying the output waveform from said second integrator filter to said second summing circuit; a third summing circuit, means for applying the output from said first, second and third integrator filters to said third summing circuit and means for applying the outputs from said first, second and third summing means to said output comparator circuit means.

4. The improved radio communications receiver according to claim 3 further including a bias source, means for applying an output voltage from said bias source to said output comparator circuit whereby said output comparator circuit means will produce an output voltage proportional to the bias voltage whenever both first and secind transmitters are silent.

5. The approved radio communications receiver according to claim 4 wherein said output comparator circuit means comprises six two-way comparison circuits.

References Cited

UNITED STATES PATENTS

| | | | |
|---|---|---|---|
| 2,108,088 | 2/1938 | Tufts | 325—452 |
| 2,926,304 | 2/1960 | Fromm | 325—363 |
| 3,202,762 | 8/1965 | Aaron et al. | 179—15 |
| 3,239,769 | 3/1966 | Lee | 325—320 |
| 3,248,653 | 4/1966 | Gabor | 325—435 |
| 3,261,919 | 7/1966 | Aaron et al. | 179—15 |
| 3,261,920 | 7/1966 | Aaron | 179—15 |
| 3,270,285 | 8/1966 | Thomas | 178—88 |
| 3,325,731 | 7/1967 | Headle | 325—363 |
| 3,383,600 | 5/1968 | Calfee | 178—88 |

RALPH D. BLAKESLEE, Primary Examiner

ALBERT B. KIMBALL, JR., Assistant Examiner

U.S. Cl. X.R.

179—15